United States Patent Office 3,513,611
Patented May 26, 1970

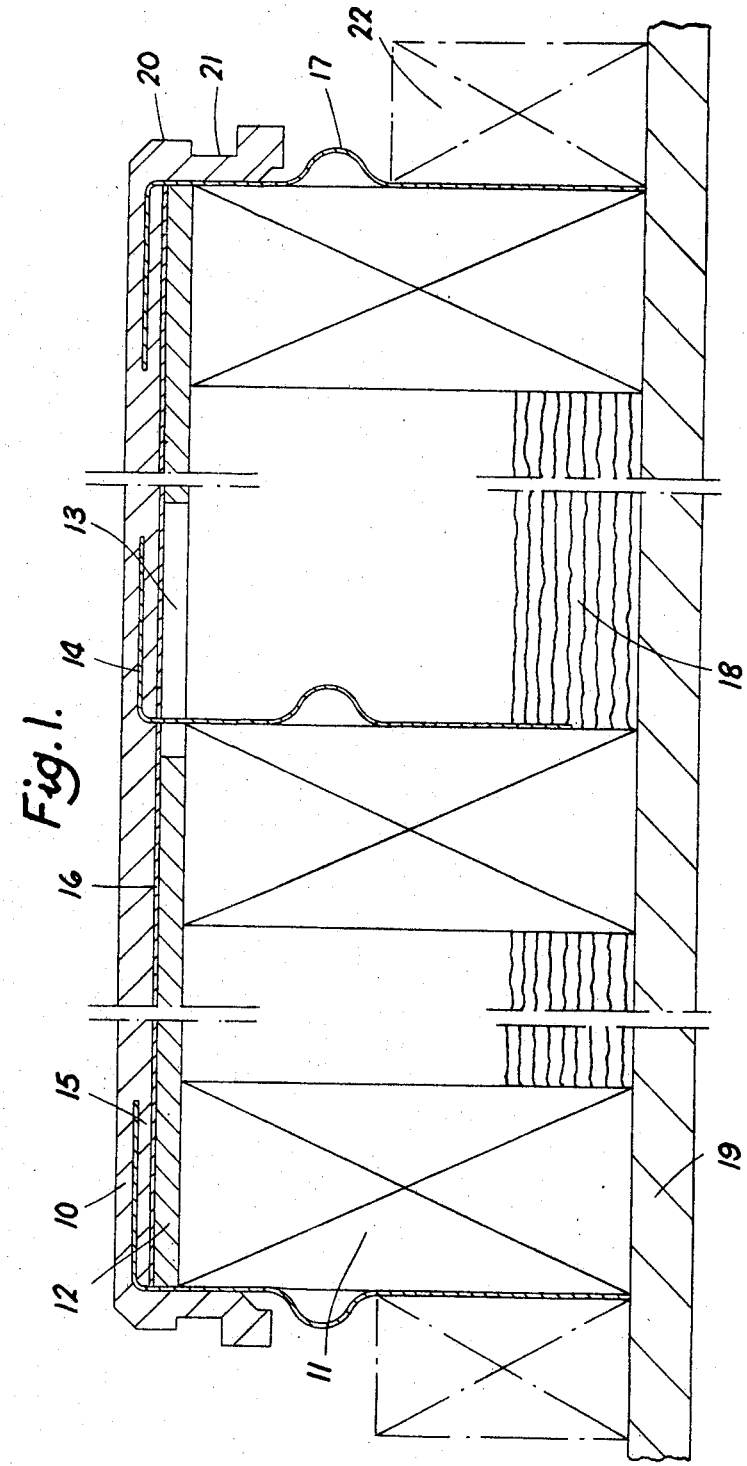

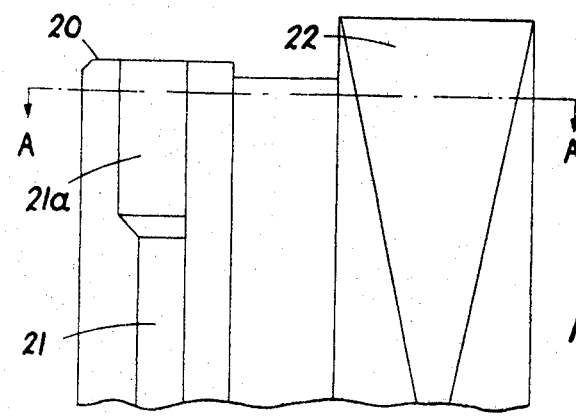
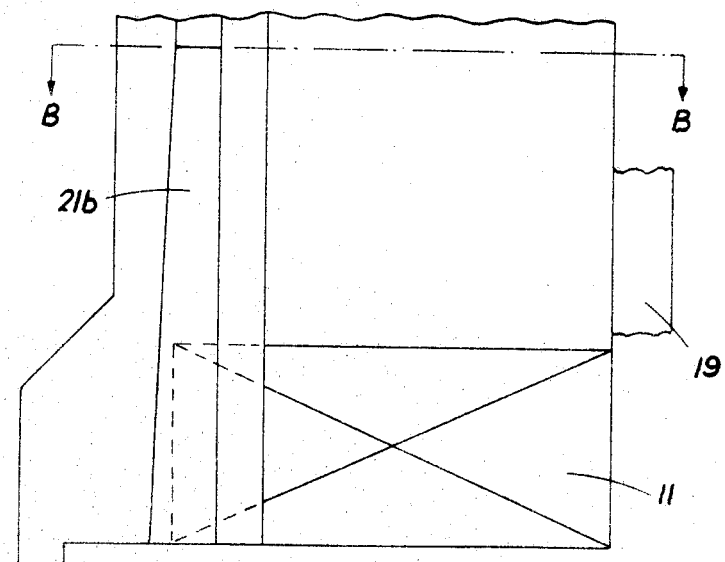
Fig. 3.
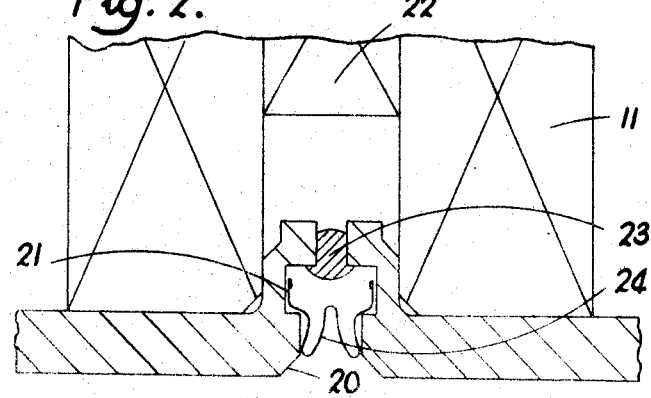
Fig. 2.

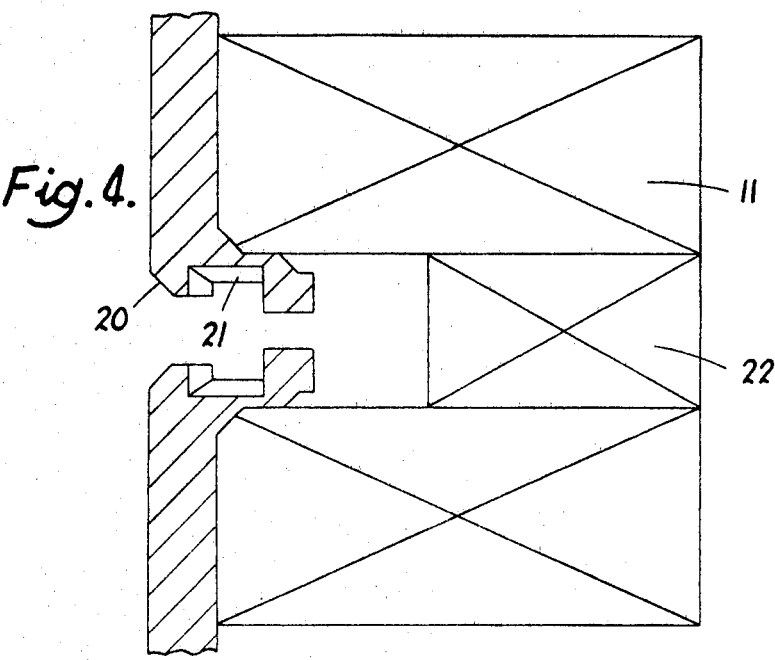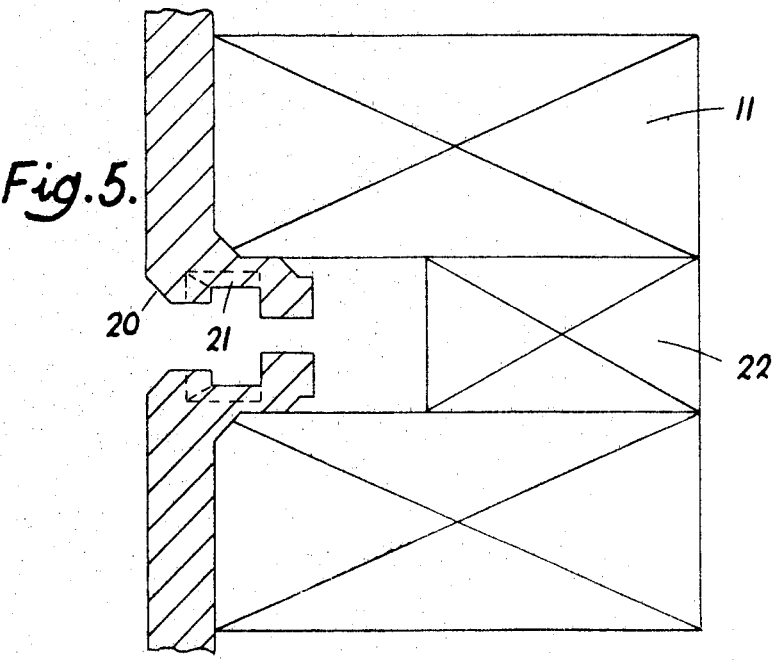

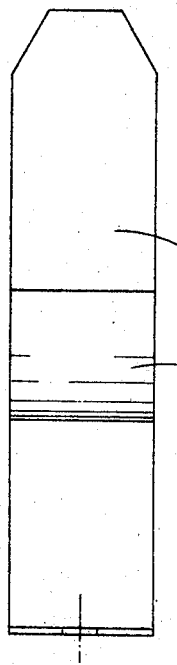
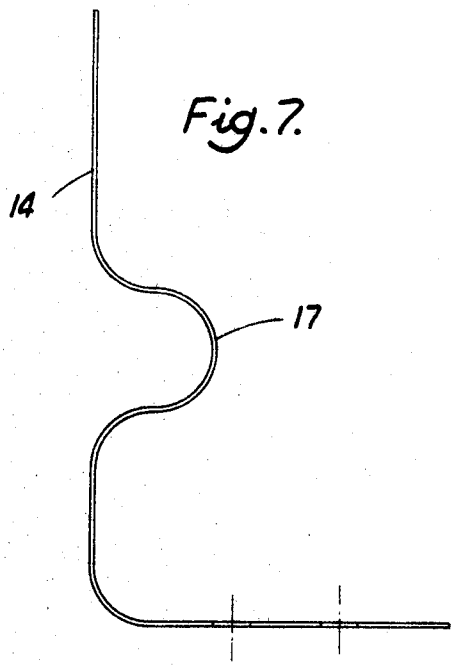

3,513,611
BUILDING UNIT WITH A RESIN LAYER AND A FIRE-RESISTANT LAYER
William James Old, Northwood, England, assignor to William Old (Resiform) Limited, North Harrow, Middlesex, England, a British company
Filed Aug. 7, 1968, Ser. No. 750,932
Claims priority, application Great Britain, Aug. 7, 1967, 36,209/67
Int. Cl. E04c 2/26; E04b 1/74
U.S. Cl. 52—309                    18 Claims

ABSTRACT OF THE DISCLOSURE

A building unit comprises a layer of glass-fiber reinforced synthetic resin and a layer of fire-resistant sheet material, the layer of fire-resistant sheet material overlying, but not directly secured to, one surface of the layer of glass-fiber reinforced synthetic resin. Support means engage the side of the fire-resistant sheet material remote from the layer of resin and bracket means connect the layer of resin to the support, said bracket means being so arranged as to permit expansion of the glass-fiber reinforced synthetic resin.

---

This invention relates to building units. The invention particularly relates to building units of the type which comprises a laminated panel of synthetic resin and fire-resistant sheet material.

It is well known to provide a building unit comprising synthetic resin with a layer of a fire-resistant sheet material bonded to, or embedded in, the synthetic resin. In use such panels are subjected to variations in temperature and the different co-efficients of expansion of the synthetic resin and the fire-resistant sheet material results in a deleterious effect on the building unit. Small cracks and blisters may occur in the resin and the weakening of the bond or keying between the synthetic resin and the fire-resistant sheet material may eventually lead to splitting of the laminated panel.

According to the present invention there is provided a building unit comprising a layer of glass-fiber reinforced synthetic resin, a layer of fire-resistant sheet material overlying, but not directly secured to, one surface of the layer of glass-fiber reinforced synthetic resin, support means engaging the side of the fire-resistant sheet material remote from the layer of resin and bracket means connecting the layer of resin to the suport, the bracket means being so arranged as to permit expansion of the glass-fiber reinforced synthetic resin. The part of the bracket means connected to the layer of resin may be embedded therein.

The bracket means may pass across an edge of the fire-resistant sheet or may pass through a hole or holes therein.

The bracket means may comprise a strip of material secured at one end to the layer of resin and secured at the opposite end to the support means, the strip being expansible intermediate of its ends to permit said expansion of the glass-fiber reinforced synthetic resin. For example the strip may be provided with an expansion kink, arch or loop intermediate of its ends.

The material may be a metal such as stainless steel or zinc, or a plastic.

The support means may comprise a block or beam, for example of timber or metal, and the sheet of fire-resistant material may be secured to the block or beam, e.g. by nailing, pinning, bonding or screwing.

Any suitable resin may be employed in the layer of glass-fiber reinforced synthetic resin, such as polyester resin. The surface of the glass-fiber reinforced synthetic resin opposite the surface which the fire-resistant sheet overlies may comprise a filler such as crushed mineral, natural stone or sand dust. It may also comprise alum and/or a pigment. In a particularly preferred embodiment of the invention the filler comprises glass grounds, glass granules or powdered glass. The fire-resistant sheet material is preferably asbestos or an asbestos-based material. Preferably the asbestos-based material comprises asbestos fiber bound with a chemical binder.

In any of the above arrangements a thin layer of a packing material may be interposed between the layer of glass-fiber reinforced synthetic resin and the fire-resistant sheet material. The packing material may be a scrim.

In another embodiment of the invention the building unit is provided with reinforcing members, constituting the support means which may conveniently be a timber or metal framing, to which the bracket means are attached. In a preferred embodiment of the invention an insulating material is placed within the framing in the spaces betwen the reinforcing members. The insulating material may be mineral wool or fiberglass quilting.

The side of the framing remote from the layer of resin may be covered by a suitable lining board, for example plasterboard.

One embodiment of the invention will now be described with reference to the accompanying drawings, in which:

FIG. 1 is a cross-section through a building unit in accordance with the present invention;
FIG. 2 is a cross-section through two adjacent panels showing the manner in which panels are jointed together;
FIG. 3 is a side elevation of the building unit shown in FIG. 1;
FIG. 4 is a cross-section through line A—A of FIG. 3;
FIG. 5 is a cross-section through line B—B of FIG. 3,
FIG. 6 is a front view of a detail of FIG. 1 and,
FIG. 7 is a side view of the detail shown in FIG. 6.

The building unit is made as follows:

A timber frame 11, whose overall dimensions are approximately 4′0″ x 8′0″ is constructed, the frame being made of 4″ x 2″ timber with uprights at 16″ centres.

To this frame is attached, by nailing, a layer 12 of 3/16″ thick asbestos-based board.

Circular holes 13, of suitable diameter are then cut in the asbestos-based board at points adjacent to the timber framing.

A layer of Gelcoat, comprising natural stone, sand dust or other suitable filler such as glass grounds, or powdered glass, pigment, alum and polyester resin type Crystic 420D is then poured into a mould and spread to form a layer which is between 1/32″ thick and 1/8″ thick. The overall dimensions of the mould are substantially the same as the timber frame.

A chopped strand mat of glass fiber reinforcement is rolled down on to the Gelcoat layer, and polyester resin Crystic 323A is poured on to the mat to form a consolidated bed 10 with the Gelcoat layer.

The metallic stamps 14, each having a part circular arch 17 of radius 3/16″ intermediate of its end, are then affixed to the polyester laminate in predetermined positions and more polyester resin and glass-fiber mat 15, and so become embedded in the rear of the laminate.

The laminate 10, when partially cured, is removed from the mould. Subsequently the timber frame with the asbestos-based board 12 affixed is laid onto the back of the laminate packing scrim 16 being placed between the asbestos-based board 12 and the laminate.

The loose end of the metal strap is then nailed to the timber frame as shown. A slightly modified form of the metal straps 14 is shown in FIGS. 6 and 7.

Mineral wood or fiberglass 18 quilting is placed between the vertical members 11 of the timber frame. The unclad side of the panel is then finished with plasterboard 19 or other suitable lining board.

FIG. 2 shows a joint between two building units of the type shown in FIG. 1. The edge 20, 14 of the panel 10, 15 is moulded in the form shown to provide a groove 21 in which a jointing strip 24 may be located. Timber battens 22 are provided at each edge of the unit to which an adjacent unit is to be jointed. As shown in FIG. 2, mastic 23 (for example that sold under the trade name "Secomastic") is placed between the edges of adjacent panels 10, 15 and a stainless steel jointing strip 24 is clipped into the opposing grooves 21. As shown in FIG. 3, 4 and 5, the upper part of each groove 21 is widened at 21a. The ends of each jointing strip 24 project from its panel into the part 21a of the groove of an adjacent panel, the extra width of the part 21a of the groove permitting the strips to overlap.

The lower part of the groove 21 in each panel tapers outwardly as shown at 21b, permitting an upper steel strip to extend downwardly in front of the upper end of a lower steel strip when panels are used for buildings of more than two storeys in height. It also guides any water outwardly away from the foundation at ground floor level.

The dimensions of the building unit may be varied and it may conveniently be up to 12' long by 10' wide. Building units according to the present invention may be employed in the construction of all types of buildings, but are particularly useful for the construction of housing.

The invention is not limited by the details of the foregoing example. For instance, instead of polyester resin any other suitable synthetic resin may be employed. Alum and pigment may be omitted from the Gelcoat mixture or may be replaced by other suitable fire resistant fillers. Any suitable fire-resistant material may be used in place of the asbestos-based board which may vary in thickness to meet specific requirements. Similarly any other packing pieces may be employed in place of the timber battens and the jointing strip may be formed from any other suitable material instead of stainless steel such as timber or aluminum. The panel may be constructed by hand, by mechanical means, or by a combination of both. Instead of timber framing, steel or any other suitable load bearing material may be employed which achieves the same purpose. Other suitable alternatives may be used in lieu of the mineral wool or glassfiber quilting. Instead of metallic straps, plastic or other material straps may be used.

In an alternative embodiment (not shown) the part-circular arch 17 of the metallic straps 14 is replaced by triangular shaped kink.

I claim:
1. In a building unit comprising a layer of glass-fiber reinforced synthetic resin and a layer of fire-resistant sheet material the improvement wherein the layer of fire-resistant sheet material underlies, but is not directly secured to, one surface of the layer of glass-fiber reinforced synthetic resin, there being support means engaging the side of the fire-resistant sheet material remote from the layer of resin and bracket means connecting the layer of resin to the support, said bracket means being so arranged as to permit expansion of the glass-fiber reinforced synthetic resin.

2. A building unit as claimed in claim 1, wherein the bracket means comprise at least one strip of material, which is secured at one end to the layer of glass-fiber reinforced synthetic resin and secured at the opposite end to the support means, said strips being expansible intermediate of its ends to permit said expansion of the glass-fiber reinforced synthetic resin.

3. A building unit as claimed in claim 2 wherein the strip of material is of metal.

4. A building unit as claimed in claim 3 wherein the metal is selected from the group consisting of stainless steel and zinc.

5. A building unit as claimed in claim 4 wherein the strip of material is provided with an expansion kink intermediate of its ends.

6. A building unit as claimed in claim 1 wherein the surface of the glass-fiber reinforced synthetic resin opposite the surface which the fire-resistant sheet underlies comprises a filler.

7. A building unit as claimed in claim 1 wherein the fire-resistant sheet material comprises asbestos.

8. A building unit as claimed in claim 1 wherein a layer of scrim is interposed between the layer of glass-fiber reinforced synthetic resin and the layer of fire-resistant sheet material.

9. A building unit as claimed in claim 1 wherein the support means are constituted by reinforcing members to which the bracket means are attached, said reinforcing members comprising a framed form of a material selected from the group consisting of timber and metal.

10. A building unit as claimed in claim 9 wherein insulating material is placed within the framing in the spaces between the reinforcing members, said insulating material being selected from mineral wool quilting.

11. A building unit as claimed in claim 9 wherein the side of the frame remote from the layer of glass-fiber reinforced synthetic resin is covered by plasterboard.

12. A building unit as claimed in claim 2 wherein the strip of material is a plastic.

13. A building unit as claimed in claim 1 wherein the surface of the glass-fiber reinforced synthetic resin opposite the surface which the fire-resistant sheet underlies comprises alum.

14. A building unit as claimed in claim 1 wherein the surface of the glass-fiber reinforced synthetic resin opposite the surface which the fire-resistant sheet underlies comprises a pigment.

15. A building unit as claimed in claim 6 wherein the filler consists of glass particles.

16. A building unit as claimed in claim 6 wherein the filler consists of stone particles.

17. A building unit as claimed in claim 6 wherein the filler consists of sand particles.

18. A building unit as claimed in claim 9 wherein insulating material is placed within the framing in the spaces between the reinforcing members, said insulating material being fiberglass quilting.

References Cited

UNITED STATES PATENTS

| 1,963,609 | 6/1934 | Balduf et al. | 52—407 |
| 2,779,978 | 2/1957 | Sundelin et al. | 52—489 |

JOHN E. MURTAGH, Primary Examiner

U.S. Cl. X.R.

52—407, 410, 481, 573